(12) United States Patent
Defrancq

(10) Patent No.: US 12,740,497 B2
(45) Date of Patent: Sep. 22, 2026

(54) HITCH DEVICE FOR AGRICULTURAL VEHICLE

(71) Applicant: Hubert Defrancq, Guignicourt (FR)

(72) Inventor: Hubert Defrancq, Guignicourt (FR)

( * ) Notice: Subject to any disclaimer, the term of this patent is extended or adjusted under 35 U.S.C. 154(b) by 359 days.

(21) Appl. No.: 17/621,551

(22) PCT Filed: Jul. 2, 2020

(86) PCT No.: PCT/EP2020/068677
§ 371 (c)(1),
(2) Date: Dec. 21, 2021

(87) PCT Pub. No.: WO2021/004888
PCT Pub. Date: Jan. 14, 2021

(65) Prior Publication Data

US 2022/0354043 A1 Nov. 10, 2022

(30) Foreign Application Priority Data

Jul. 5, 2019 (FR) ........................................ 1907530

(51) Int. Cl.
*A01B 59/042* (2006.01)
*A01B 59/00* (2006.01)
(Continued)

(52) U.S. Cl.
CPC .......... *A01B 59/042* (2013.01); *A01B 59/004* (2013.01); *B60D 1/141* (2013.01); *A01B 59/066* (2013.01)

(58) Field of Classification Search
CPC . A01B 59/002; A01B 59/004; A01B 59/0415; A01B 59/042; A01B 59/043;
(Continued)

(56) References Cited

U.S. PATENT DOCUMENTS 2,729,469 A * 1/1956 Wilson ................. A01B 59/042
172/450
2,731,898 A * 1/1956 Frevik .................. A01B 59/066
172/450

(Continued)

FOREIGN PATENT DOCUMENTS

EP 0990381 A1 4/2000
FR 2740649 A1 5/1997

(Continued)

OTHER PUBLICATIONS

International Search Report mailed Sep. 18, 2020, in International Application No. PCT/EP2020/068677; 4 pages (with English Translation).

(Continued)

*Primary Examiner* — Christopher J Sebesta
*Assistant Examiner* — Audrey L Lusk
(74) *Attorney, Agent, or Firm* — Greer, Burns & Crain, Ltd

(57) ABSTRACT

A hitch device for an implement, suitable for being mounted on an agricultural vehicle, including a chassis transverse to the direction of travel of the hitch, a system for coupling an agricultural implement to the chassis, the coupling system being designed to pivot freely relative to the chassis, about a vertical axis, an attachment device for attaching the chassis to the agricultural vehicle, the attachment device including at least two arms intended to link the chassis to the agricultural vehicle, and each carrying two pivot links that together define a deformable parallelogram.

15 Claims, 4 Drawing Sheets

(51) Int. Cl.
*A01B 59/06* (2006.01)
*B60D 1/14* (2006.01)

(58) Field of Classification Search
CPC ..... A01B 59/06; A01B 59/065; A01B 59/066; A01B 59/006; A01B 59/062
See application file for complete search history.

(56) References Cited

U.S. PATENT DOCUMENTS 2,819,665 A * 1/1958 Skeem ................. A01B 59/066 172/444
3,001,590 A * 9/1961 Tsuchiya ................ A01B 59/00 172/741
3,065,977 A * 11/1962 Richardson ........... E02F 3/3618 280/474
3,207,529 A * 9/1965 Harper ................. A01B 59/067 172/450
3,657,831 A * 4/1972 Kant ...................... A01B 13/00 405/184
3,704,534 A * 12/1972 Preu .......................... E02F 3/10 37/353
3,829,128 A * 8/1974 Sutton .................. A01B 59/062 172/272
4,019,753 A * 4/1977 Kestel .................. A01B 59/062 280/416.2
4,147,374 A * 4/1979 Jeffes ....................... B60D 1/04 280/504
4,216,975 A 8/1980 Schafer
4,397,359 A * 8/1983 Price .................... A01B 59/043 172/450
4,640,365 A * 2/1987 Schmidt ............... A01B 69/004 180/401
4,711,460 A * 12/1987 Schmittbetz ......... A01B 59/041 172/450
4,919,215 A * 4/1990 Lee ...................... A01B 59/041 172/450
5,246,077 A 9/1993 Tjaden et al.
5,697,454 A * 12/1997 Wilcox ................ A01B 59/068 280/460.1
5,971,082 A * 10/1999 Satzler ................. A01B 59/066 172/679
6,056,069 A * 5/2000 Hagen .................. A01B 59/004 403/44
11,277,954 B2 * 3/2022 Defrancq ............. A01B 59/062
2002/0034432 A1 * 3/2002 Schmidt ............... A01B 59/048 414/920
2002/0084085 A1 * 7/2002 Pellenc .............. B62D 49/0607 172/762
2003/0159842 A1 * 8/2003 Casali .................. A01B 59/004 172/450
2008/0142231 A1 * 6/2008 Priepke ................ A01B 71/063 172/275
2008/0264656 A1 * 10/2008 Kapfer ................. A01B 59/004 172/663
2016/0174452 A1 * 6/2016 Buttjer ................. A01B 59/004 172/448
2017/0290258 A1 * 10/2017 Mollick ................. A01B 63/02
2018/0372490 A1 * 12/2018 Gresch ................... A01B 76/00

FOREIGN PATENT DOCUMENTS

FR 2850525 A1 8/2004
RU 2226325 C2 4/2004
RU 2472329 C2 1/2013
SU 898972 A1 1/1982
WO 2018172458 A1 9/2018

OTHER PUBLICATIONS

ISO 730:2009(E), "Agricultural wheeled tractors—Rear-mounted three-point linkage—Categories 1N, 1, 2N, 2, 3N, 3, 4N and 4", ISO 2009, First Edition, Jan. 15, 2009, 20 pages.

* cited by examiner

[Fig. 1]
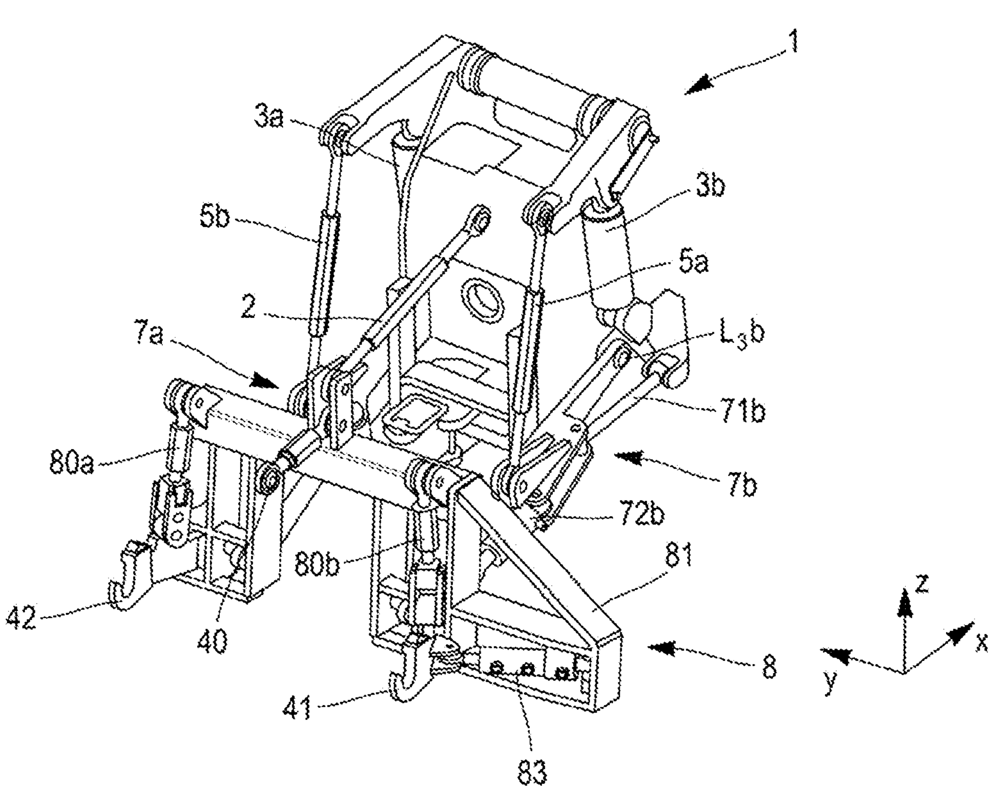
[Fig. 2]
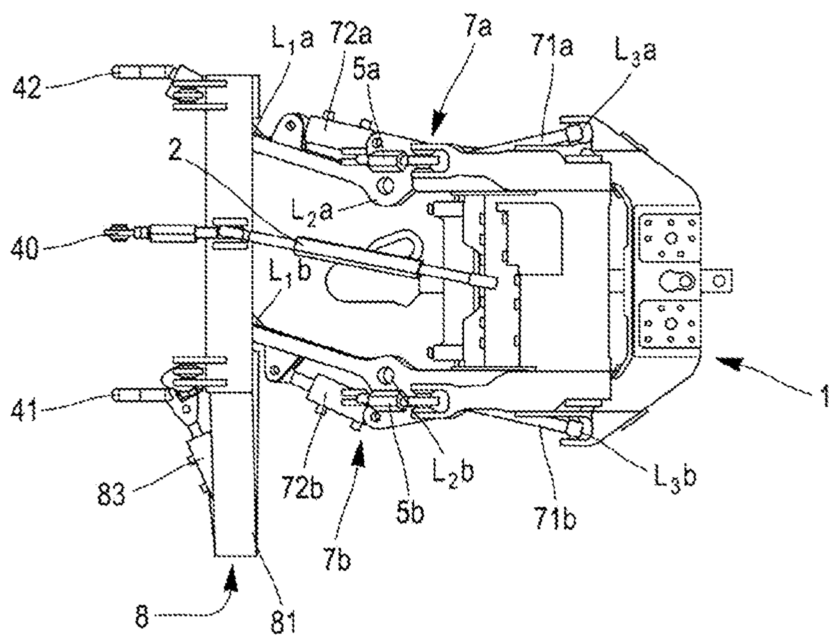

[Fig. 3]
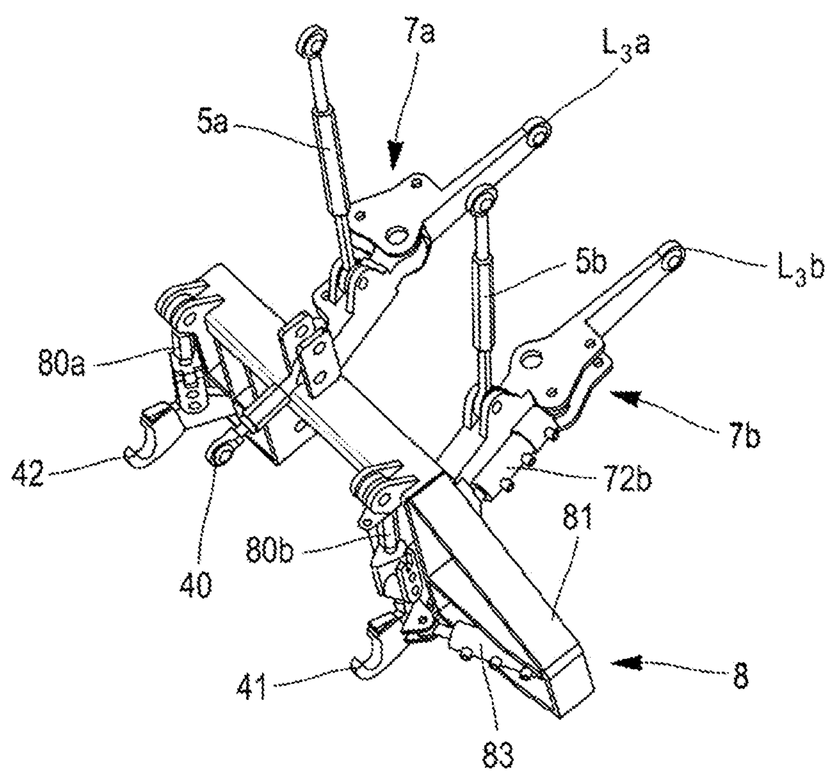
[Fig. 4]
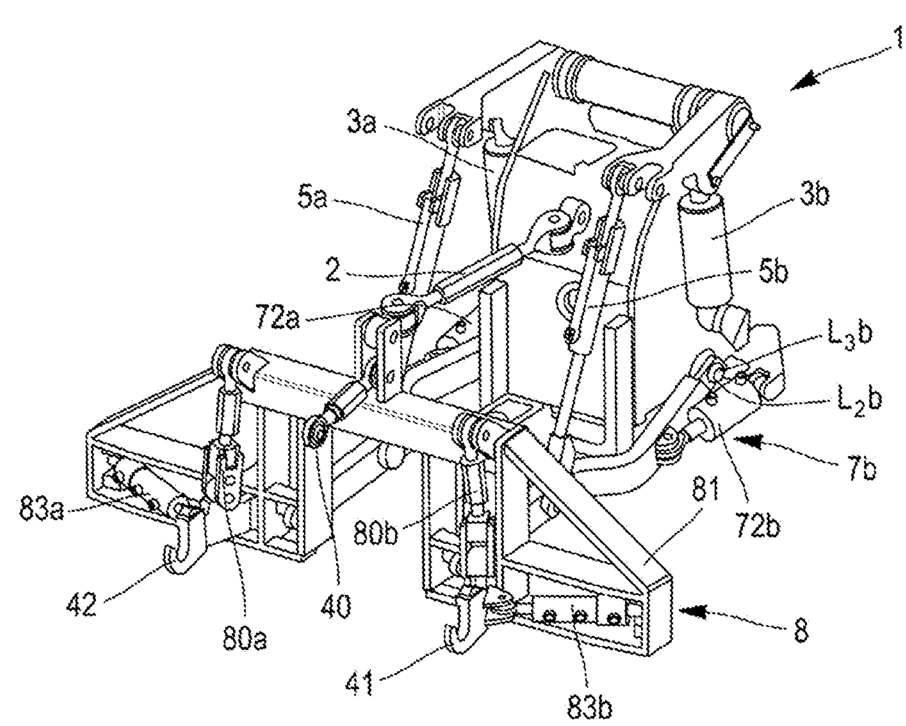

[Fig. 5]
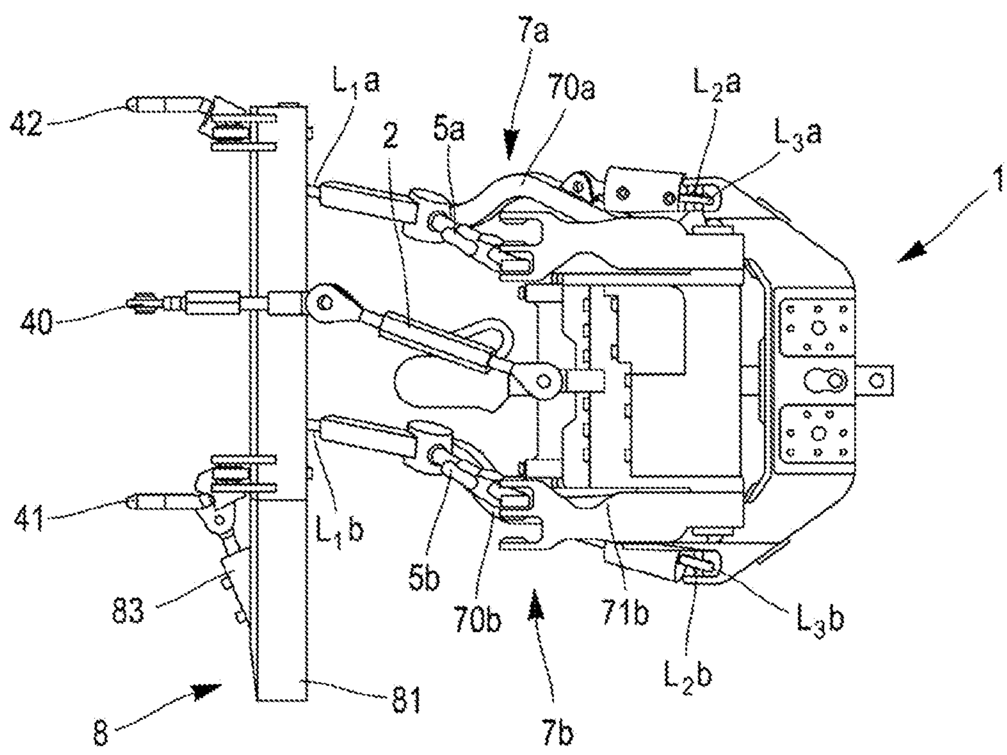
[Fig. 6]
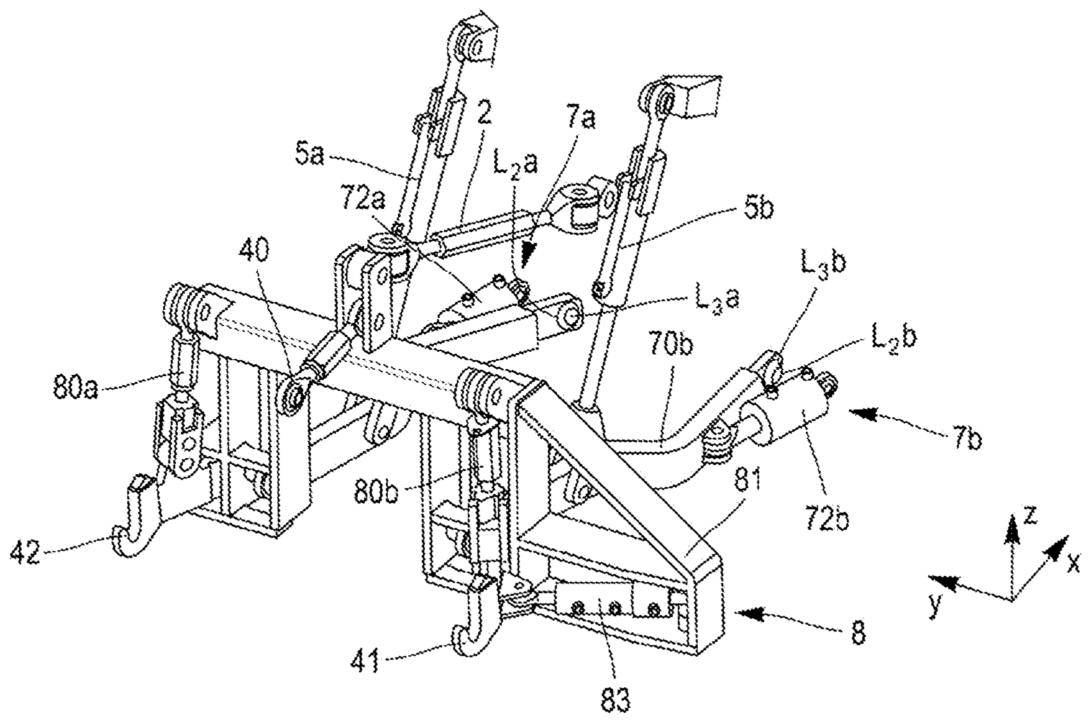

[Fig. 7]
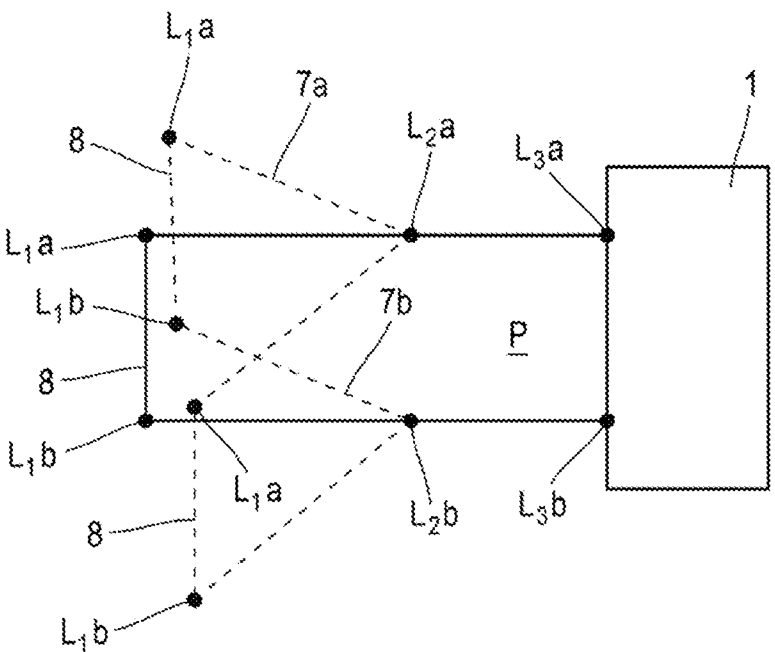
[Fig. 8]
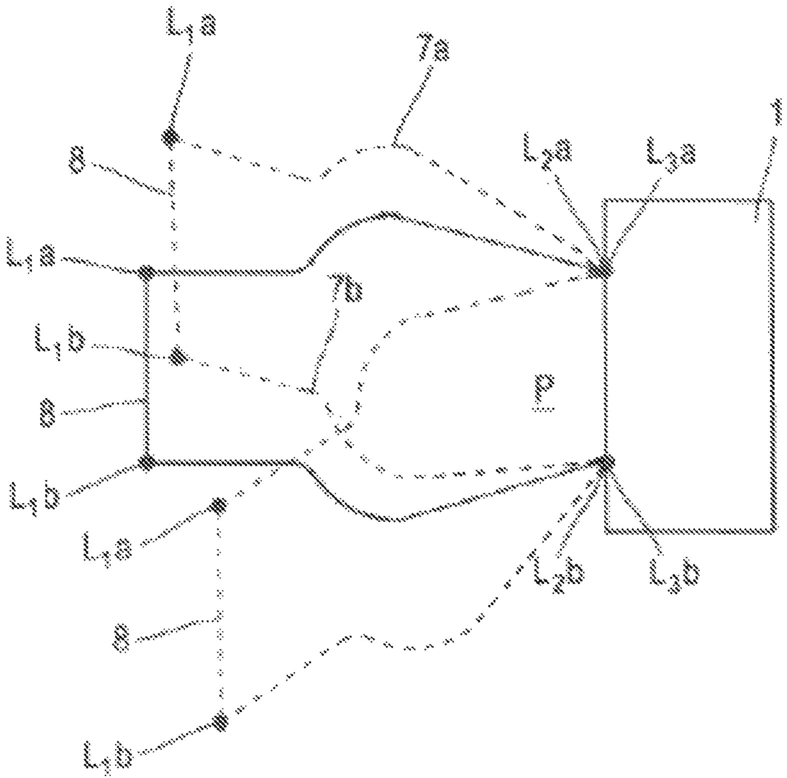

HITCH DEVICE FOR AGRICULTURAL VEHICLE

FIELD

The present invention relates to the field of technical vehicles and particularly relates to a hitch and lifting device for an agricultural implement suitable for being mounted on an agricultural vehicle, and more specifically to the rear of said vehicle.

The present invention more specifically relates to the lateral adjustment of the position of agricultural implements towed by a vehicle able to laterally vary the position of the implement in response to a signal, so as to reliably maintain a preselected path or to follow the existing crop rows in order to avoid damaging the crop during crop treatment operations. The signal can be a geolocation signal (GPS), a video image, an ultrasonic sensor or a mechanical sensor.

BACKGROUND

Agriculture has developed in terms of accuracy by virtue of the advent of satellite navigation systems, such as GPS, or even means for the non-destructive detection of existing crops. By using GPS equipment, a farmer can thus locate a precise position in a field, which allows precise mapping of the exploited areas, in accordance with a large number of parameters, such as the yield of the crops, the topography, the organic matter content, the moisture level, the nitrogen content, the pH and the other parameters. Manufacturers of precision equipment have begun to supply automated steering systems that use the GPS signals to direct an agricultural vehicle, and in particular a tractor, on a predetermined path. Although such equipment works well for reliably and precisely guiding the agricultural vehicle, the ground and topography variations limit the reliable and precise positioning of the towed implements.

Several solutions have been contemplated for controlling the geolocation of an agricultural implement hitched to a tractor.

Such solutions are linked to the tow bar of the tractor or to the two lower points of the rear hitch. These solutions involve a fixed link to the tractor by means of a tow bar or even two or three attachment points, and an interface for transversely moving the implement, as a function of the signal for geolocating or detecting the existing crop, so that the implement follows the same direction as the tractor or avoids damaging the existing crop.

According to a first approach, the interface for moving the implement turns said implement about a vertical axis. In order to work, the rear hitch of the tractor must have a free-floating capability. The implement must be equipped with a device embedded in the ground (basically at least one disk) that generates a lateral force in order to move the implement in the desired direction. This correction system is nevertheless sensitive to the ground type and the incline of the terrain.

According to a second approach, the interface for moving the implement causes said implement to move translationally. In order to work, the rear hitch of the tractor must be locked, without any possible float. However, this type of solution is not compatible with implements deeply embedded in the ground.

One solution then involves equipping the interface with anchors, against which a movement reaction is applied in order to move the work unit to the side, whereas the rear hitch of the tractor has a free-floating capability. These arrangements nevertheless are only applicable to low traction implements and to implements with limited anchoring in the ground.

Another solution, described in document WO 2016/041547 A1, proposes modifying the hitch by varying the length of the arms by means of a cylinder in order to allow the interface to rotate in addition to the translation movement of the implement. However, this solution requires modification of standard hitches and involves complex control of the concomitant movements of the hitch and of the interface.

According to a third approach, document U.S. Pat. No. 6,089,328 A1 describes a rear hitch provided with cylinders for controlling the lateral movement of the lower arms. However, this configuration, as defined, does not allow the desired function to be provided. Indeed, the spacing of the arms is narrow in the part opposite the hitch of the implement relative to the side of the hitch of the implement, the width of which is defined by the ISO 730/1 standard.

As a result, the possible movement is limited by the width available between the wheels of the tractor (with this width being a function of the width of the wheels), the spacing between the rows of crops and the total width restriction of the vehicle for road travel.

Furthermore, during offset lateral movement, the implement is oriented in a direction opposite to its movement and describes an arc of a circle, which alters its ability to work in a straight line, and disrupts the trajectory of the tractor.

According to a fourth approach, document WO 2018/172458 proposes laterally moving the agricultural implement relative to the agricultural vehicle in order to compensate for the offset of the convergence point, so that the implement remains positioned relative to its desired trajectory, with this being despite the asymmetries of the ground and of the relief. FIG. 3 of document WO 2018/172458 more specifically describes two rigid shafts 63, 64, on which the lifting arms 7*a*, 7*b* can be attached, which arms by definition allow the implement to be lifted so as to keep it away from the ground. The controlled lateral movements for displacement between the chassis 6 and the chassis 8 demand that the link between the chassis 6 and the lifting arms 7*a*, 7*b* only allows pivoting about the transverse axis. The pivoting about the vertical axis is only ensured by the pivoting along the alpha angle of the hooks 41 and 42 arranged at the rear of the second chassis.

This solution allows the agricultural vehicle to move laterally so that the implement follows the desired trajectory despite its offsets relative to the vehicle. This solution has the advantage of being universal by being able to be installed on any rear hitch of a tractor.

However, this results in a significant weight and an increase in the offset of the implement relative to the tractor.

For this reason, it has been necessary for a lighter solution to be developed that can adapt to the standards of agricultural vehicles without having to apply a modification, and that can be compatible with the limited space available at the rear hitch and with large ground anchoring tools.

Thus, the subject matter of the present invention aims to ensure the lateral movement of the hitch, which cannot be provided by the agricultural vehicle, whilst maintaining the flexibility of a link allowing self-alignment of the hitch, whilst reducing the weight and the offset of the device.

SUMMARY

The subject matter of the invention involves controlling the transverse movement of the hitch arms by means of a development of the movable part of the device in order to ensure the compatibility of the links and their functionality.

More specifically, the subject matter of the invention is a hitch device for an implement, suitable for being mounted on an agricultural vehicle, comprising:

a chassis transverse to the direction of travel of the hitch;

a system for coupling an agricultural implement to said chassis, said system being designed to pivot freely about the vertical axis, relative to the chassis;

an attachment device for attaching the chassis to the agricultural vehicle, the attachment device comprising at least two arms provided with activation means and intended to link the chassis to the agricultural vehicle and extending in a direction substantially parallel to the direction of travel of the hitch, wherein each of the arms comprises, at the proximal end thereof relative to the chassis, a first pivot link with the chassis, allowing at least one portion of said arm to pivot relative to the chassis about the vertical axis, as well as a second pivot link with the agricultural vehicle, allowing at least said portion of said arm to pivot relative to the agricultural vehicle about the vertical axis, the set of four pivot links thus defining a deformable parallelogram that is deformable under the action of the activation means.

Optional, additional or alternative features of the invention are set forth hereafter.

According to a specific embodiment, the second pivot link of the arms can be disposed at the distal end of said arms relative to the chassis, with said distal end also forming an attachment for attaching said arms to the agricultural vehicle, said arms also each having an elbow, the convexity of which is outward facing.

According to another embodiment, the second pivot link of the arms can be arranged approximately at the middle of said arms.

The portion of the arms located between the second pivot link and the point of attachment with the agricultural vehicle can be supported by a reinforcement.

The device for coupling the agricultural implement to the chassis can comprise two hooks disposed on the lower part of the chassis, symmetrically relative to the vertical median plane of said chassis, with said hooks extending in the opposite direction to the direction of travel of the hitch.

The hooks located on the lower part of the chassis can also pivot about a transversely extending axis of the chassis, said hooks also can be retained by means of lift links.

The pivot angle of the two hooks about the vertical axis can range between 0° and +/−30°, and preferably between 0° and +/−15°.

The pivoting of the hooks about the vertical axis can be controlled by at least one cylinder, with said at least one cylinder being able to work in a first mode corresponding to the free rotation of the hooks about the vertical axis, and a second mode, in which the rotation of the hooks about the vertical axis can be locked, with the chassis being transversely extended by a first stabilizer, and even a second stabilizer.

The coupling device can further comprise a third hook located on the upper part of the chassis, with said hook forming an element for retaining the agricultural instrument.

The attachment device for attaching the chassis to the agricultural vehicle can comprise, in the upper part, a link element between the upper part of the chassis and the agricultural vehicle, the arms also advantageously can be controlled in terms of lift, with each of the attachments for attaching the arms to the agricultural vehicle then defining a pivot link about the axis extending transverse to the direction of travel of the hitch.

The arms can be controlled by lifting means and retained by lift links.

The arms can be controlled by lifting means integrated in the lift links.

The means for activating the pivoting of the arms can be formed by two single-acting cylinders each assigned to one arm, or even can be formed by a single double-acting cylinder assigned to one of the two arms.

The lifting means can be single-acting or double-acting cylinders.

The pivot angle of the arms about the vertical axis can range between 0 and +/−45°, and preferably between 0 and +/−30°.

The hitch device can comprise a sensor C for identifying the position of the chassis relative to the agricultural vehicle.

BRIEF DESCRIPTION OF THE DRAWINGS

Further advantages and features of the invention will become apparent from reading the detailed description of non-limiting implementations and embodiments, and with reference to the following accompanying drawings, in which:

FIG. 1 is a perspective view of a hitch device attached to an agricultural vehicle according to a specific embodiment of the invention;

FIG. 2 is a top view of said device;

FIG. 3 is a perspective view of said device alone;

FIG. 4 is a perspective view of a hitch device attached to an agricultural vehicle according to another embodiment of the invention;

FIG. 5 is a top view of said device;

FIG. 6 is a perspective view of said device alone;

FIG. 7 is a block diagram of the embodiment of the invention shown in FIGS. 1, 2 and 3;

FIG. 8 is a block diagram of the embodiment of the invention shown in FIGS. 4, 5 and 6.

DETAILED DESCRIPTION

For the sake of clarity and conciseness, the reference signs in the figures correspond to the same elements.

With the embodiments described hereafter being non-limiting, alternative embodiments of the invention can be particularly considered that comprise only a selection of the described features, isolated from the other described features (even if this selection is isolated within a sentence comprising these other features), if this selection of features is sufficient to provide a technical advantage or to differentiate the invention from the prior art.

This selection comprises at least one feature, preferably functional without structural details, or with only part of the structural details if this part only is sufficient to provide a technical advantage or to differentiate the invention from the prior art.

Furthermore, the various features, forms, alternative embodiments and embodiments of the invention can be associated with each other according to various combinations, insofar as they are not incompatible or exclusive of each other.

FIGS. 1 and 4 show a perspective view of a hitch device according to a first embodiment and a second embodiment of the invention. The device is shown attached to an agricultural vehicle 1.

The device comprises a chassis 8 transverse to the direction of travel of the hitch.

(x) defines the direction of travel of the hitch, i.e. the direction in which the agricultural vehicle advances.

(z) defines the vertical direction relative to the ground and (y) defines the direction transverse to the direction of travel of the hitch, with this direction therefore being perpendicular to (x) and to (z).

As shown in FIGS. 1 and 4, the chassis 8 extends in a plane perpendicular to the direction (x), and more specifically in the transverse direction (y).

The chassis comprises, on the rear face thereof, as opposed to the front face thereof, which is positioned facing the agricultural vehicle, a system 41, 42 for coupling an agricultural implement to said chassis.

This coupling system 41, 42 is designed to pivot freely about the vertical axis (z) relative to the chassis 8.

This coupling system 41, 42 is preferably positioned in the lower part of the chassis 8.

This coupling system incidentally can be pivotably controlled by cylinders 83, 83*a*, 83*b*.

In this case, the chassis is extended by a first stabilizer 81, as shown in FIGS. 1, 2, 3, or even by two stabilizers distributed on each side of the chassis, as shown in FIG. 4.

These stabilizers 81 support the cylinders 83, 83*a*, 83*b*, and allow the agricultural implement to be maintained perpendicular to its trajectory, and therefore prevent it from oscillating under the effect of the terrain (for example, rugged terrain) or even in the event of dynamic instability of the agricultural implement, or even in the raised position of the implement.

According to the principle of the invention, the hitch device comprises an attachment device for attaching the chassis 8 to the agricultural vehicle.

This attachment device comprises at least two arms 7*a*, 7*b* that extend in a direction substantially parallel to the direction (x) of travel of the hitch.

According to the invention, each arm 7*a*, 7*b* comprises, at the proximal end thereof relative to the chassis 8, a first pivot link L1*a*, L1*b*. The initial function of these links is to attach the proximal end of the arms to the chassis 8. These links are then used to allow at least one portion of the arms to pivot relative to the chassis 8 about the vertical axis (z).

Still according to the invention, each of the arms further comprises a second pivot link L2*a*, L2*b*, which allows at least said portion of the arms to pivot about the vertical axis (z) relative to the agricultural vehicle.

In all cases, the pivoting of the portion of the arm occurs under the action of activation means 72*a*, 72*b*.

Thus, as shown in FIGS. 7 and 8, the set of four pivot links L1*a*, L1*b*, L2*a*, L2*b* defines a deformable parallelogram P that deforms when the arms 7*a*, 7*b* (or their portion) pivot about the vertical axis (z) relative to the chassis and relative to the vehicle.

A parallelogram is conventionally understood to be a quadrilateral, the two opposite sides of which are parallel.

Of course, within the scope of the invention, the arms 7*a*, 7*b* (or their portion) allow parallelism that is not absolute but is relative in the sense that mounting said arms on the agricultural vehicle and coupling them to the chassis 8 is subject, on the one hand, to the imprecisions inherent in manufacturing mechanical parts and, on the other hand, to the deformations that occur when using hitch devices.

Thus, it is understood that the parallelism of the arms 7*a*, 7*b* (or their portion) can be downgraded to more or less 10 degrees due to a manufacturing fault or even due to a deformation that occurred during intensive use of the hitch device or due to accidental damage.

In the present case, and irrespective of the embodiments of the invention, the arms 7*a*, 7*b* have a fixed length, which cannot vary for a given embodiment.

Given the stiffness of the arms, the pivoting of the arms about the vertical axis (z) relative to the chassis causes the arms to pivot about the vertical axis (z) relative to the vehicle, and vice versa.

In order to meet the requirements of the user, the pivoting angle of the arms 7*a*, 7*b* about the vertical axis (z) ranges between 0 and +/−45°, and preferably between 0 and +/−30°.

The pivoting amplitude is actually a function of the desired offset and of the length of the arms.

According to a first embodiment shown in FIGS. 1, 2 and 3, the second pivot link L2*a*, L2*b* of the arms 7*a*, 7*b* is arranged approximately at the middle of said arms. According to this configuration, the portion of the arms ranging between the pivot link L2*a*, L2*b* and the attachment L3*a*, L3*b* for attaching said arms to the agricultural vehicle is not free to rotate about the vertical axis (z). This is contrary to the portion of the arms ranging between the pivot link L2*a*, L2*b* and the pivot link L1*a*, Lib with the chassis that is free to rotate about the vertical axis (z).

This configuration allows lateral movement of the pivot links L1*a* and L1*b*, which avoids interference with the elements of the structure of the agricultural vehicle, such as the tow bars, the hitch devices for a towed implement, the means for controlling powered implements.

In this embodiment, the pivoting of the portion of arms occurs under the action of activation means 72*a*, 72*b* assigned to each of the arms 7*a*, 7*b*.

These activation means 72*a*, 72*b* are of the single-acting or even double-acting cylinder type attached, on the one hand, to the agricultural vehicle at the second pivot link L2*a*, L2*b*, and, on the other hand, to the arms 7*a*, 7*b*, before the first pivot link L1*a*, Lib of the arms with the chassis, or even directly on the chassis 8.

It will also be possible to contemplate using only one activation means of the double-acting cylinder type, then assigned to only one arm.

It will also be possible to contemplate using two double-acting cylinders, for each of the arms.

According to an improvement of the first embodiment shown in FIGS. 1, 2, the portion of arms located between the second pivot link L2*a*, L2*b* and the attachment point for attaching to the agricultural vehicle is supported by a reinforcement 71*a*, 71*b*.

This addition allows the stiffness, and more generally the mechanical resistance, of the hitch device to be increased as a whole, and also ensures that the pivots L2*a* and L2*b* do not laterally move in order to have a precise lateral movement of L1*a*-L1*b*.

According to an alternative embodiment of this first embodiment (not shown in the figures), the second pivot link L2*a*, L2*b* of the arms 7*a*, 7*b* is arranged approximately on the attachment L3*a*, L3*b* for attaching said arms to the agricultural vehicle.

In this configuration, each of the arms 7*a*, 7*b* fully pivots relative to the agricultural vehicle and relative to the chassis 8 under the action of activation means 72*a*, 72*b*.

According to a second embodiment shown in FIGS. 4, 5 and 6, the second pivot link L2*a*, L2*b* of the arms 7*a*, 7*b* is integrated in the attachment L3*a*, L3*b* for attaching said arms to the agricultural vehicle. As a result, the second pivot link L2*a*, L2*b* of the arms 7*a*, 7*b* is disposed at the other distal end of the arms 7*a*, 7*b*. The proximal end relative to the chassis of the arms 7_a_, 7_b_ comprises, by way of a reminder, the first pivot link L1_a_, L1_b_ of the arms with the chassis.

Moreover, each of the arms 7_a_, 7_b_ has an elbow 70_a_, 70_b_, the convexity of which is outward facing.

This curvature avoids interference with the elements of the structure of the agricultural vehicle, such as the tow bars, the hitch devices for a towed implement, the means for controlling powered implements.

In a mode for the simplified construction of an agricultural vehicle that will not include any risk of interference, the arms 7_a_, 7_b_ do not need clearance curvatures 70_a_, 70_b_.

By way of an example, the length of the arms 7_a_, 7_b_ is determined by the need to position the chassis 8 so that there is no interference with the elements for transferring power to the ground (namely, the tracked wheels).

The position of the curvatures 70_a_, 70_b_ is determined by the location of the components of the chassis of the agricultural vehicle that should be avoided during the lateral movement of the arms 7_a_, 7_b_.

In this embodiment, the pivoting of the portion of arms occurs under the action of activation means 72_a_, 72_b_ assigned to each of the arms 7_a_, 7_b_.

These activation means 72_a_, 72_b_ are of the single-acting or even double-acting cylinder type, attached, on the one hand, to the agricultural vehicle, on the second pivot link L2_a_, L2_b_, and, on the other hand, to the arm 7_a_, 7_b_.

The positioning of the cylinders on the arms 7_a_, 7_b_ is determined by the lateral space constraints, hence the benefit of linking them before the wide zone represented by the elbows 70_a_, 70_b_.

It will also be possible to contemplate using only one activation means of the double-acting cylinder type, then assigned to only one arm.

In this configuration, the bent lifting arms have a threefold function:

- the spacing of the link points with the module for linking to the implement is equivalent to the spacing of the front anchoring points, toward the agricultural vehicle in order to form a parallelogram, so that the lateral movement does not affect the orientation of the module for linking to the implement relative to the agricultural vehicle;
- the closeness of the arms in the rear part toward the agricultural implement enables the lateral clearance to be increased without generating any interference with the tires or tracks of the agricultural vehicle;
- the bent shape of the arms allows lateral clearance of the module for linking with the agricultural implement without interfering with the other components located at the rear of the agricultural vehicle.

Advantageously, and independently of the first and second embodiments, the system for coupling the agricultural implement comprises two hooks 41, 42 disposed on the lower part of the chassis, symmetrically relative to the vertical median plane, with said hooks extending in the direction opposite the direction of travel of the hitch.

These hooks are mounted on lugs, which extend from the outer face of the chassis in the direction opposite the direction of travel of the hitch, i.e. toward the rear. These hooks can be brackets, latches or any other attachment part.

The lugs are advantageously mounted along a pivot link for pivoting freely about the vertical axis (z) on the lower part of the chassis. Thus, when the chassis translationally moves in the transverse direction (y), the pivoting authorized by the free movement of the hooks ensures that the translation movement is performed without causing any stress that would disrupt the trajectory of the agricultural vehicle and without imposing excessive lateral stresses on the agricultural implement.

Said agricultural implement continuously self-balances during the offset movement of the chassis and repositions itself on the desired trajectory without any mechanical stresses disrupting the forward movement of the agricultural vehicle. The convergence that is permitted between the directions taken by the hooks causes a slight rotation of the agricultural implement, which facilitates its offset movement and which stabilizes it in its natural trajectory.

The pivot angle that is permitted about the vertical axis (z) generally ranges between 0 and +/−30°, and preferably between 0 and +/−15°.

According to the embodiment described in FIG. 4, the pivoting about the vertical axis of the hooks 41, 42 also can be controlled by means of two cylinders 83_a_, 83_b_, with each of said cylinders being respectively associated with one of the hooks 41, 42. This configuration helps to maintain the distance between the hooks 41, 42, thus facilitating rigid coupling of the agricultural implement with the chassis 8.

According to another alternative embodiment shown in FIGS. 1, 2, 3, 5, 6, the pivoting about the vertical axis (z) of the hooks 41, 42 can be controlled by means of a single cylinder 83 then associated with a single hook 41. In this configuration, the pivoting of the hook controlled by the cylinder causes the other freely mounted hook to pivot, through the deflection of the frame of the agricultural implement itself.

Controlling the pivoting of the hooks 41, 42 by means of one or two cylinders particularly allows the agricultural implement to return to the axis of the direction of travel. Indeed, when the implement needs to be lifted, the hitch assembly needs to be repositioned in the axis of the direction of travel and its pivoting, and as a result any random lateral movements, needs to be prevented.

In this case, the chassis is extended by a first stabilizer 81, as shown in FIGS. 1, 2, 3 or even by two stabilizers distributed on each side of the chassis, as shown in FIG. 4.

These stabilizers 81 support the cylinders 83, 83_a_, 83_b_, and allow the chassis to be kept perpendicular to its trajectory, and therefore prevent it from oscillating under the effect of the terrain (for example, rugged terrain) or even in the event of dynamic instability of the agricultural implement, or even in the raised position of the implement.

The pivoting of the hooks 41 and 42 also can be controlled by locking the free rotation of the hooks about their vertical axis, by means of a simple mechanical element, and not a cylinder.

Advantageously, and so as to allow the implement to naturally find its towing balance point, the hooks 41, 42 can also pivot in the transverse direction, i.e. about the transverse axis (y).

To this end, and as shown in FIGS. 1, 3, 4, 6, the hooks 41, 42 located on the lower part of the second chassis are retained by lift links 80_a_, 80_b_. This assembly allows and facilitates the progression of the agricultural implement so as to overcome the effects of the ground type and the incline of the terrain.

The lift links can be configured according to a fixed or floating length mode. When the lift link function is implemented by means of hydraulic cylinders, they can then remotely control the fixed length and floating length modes, the oscillation modes and the modes for increasing the lifting travel of the implement, in addition to or instead of the lifting travel of the device for linking to the chassis of the agricultural vehicle.

Advantageously, and independently of the first and second embodiments, an additional hook 40 is located on the upper part of the chassis and can be added in order to retain the implement when lifting so that said implement can be lifted in its entirety. The presence of a hook 40 allows the agricultural implement to be used in semi-supported mode, even supported subject to having a link element 2 between the upper part of the chassis and the agricultural vehicle.

In order to follow the floating movements of the agricultural implement (with these movements being included in the horizontal plane), the hook 40 located on the upper part of the chassis can also pivot about the vertical axis (z). To this end, the hook 40 can be attached to the upper part of the chassis and the agricultural implement by means of a ball joint link, for example.

Advantageously, and independently of the first and second embodiments, the attachment device for attaching the chassis to the agricultural vehicle comprises, in the upper part, a link element 2 between the upper part of the chassis and the agricultural vehicle. This link element can be formed by another arm attached by one of the ends thereof to an articulation point on the agricultural vehicle and by the other end thereof to an articulation point on the chassis. Of course, these articulation points are of the ball joint or double articulation type, in order to allow translational movement of the chassis along the transverse axis, as well as to allow said chassis to be lifted.

It is also possible to contemplate, within the scope of the invention, as a third embodiment (not shown in the figures), the pivoting of the link element 2 to be allowed to be activated by means of the activation means 72*a*, 72*b*. The pivoting of the link element 2 about the axis (z) and relative to the agricultural vehicle 1 and the chassis 8 would then cause the arms 7*a*, 7*b* to pivot and the parallelogram P to deform.

Advantageously, and independently of the first and second embodiments, the arms 7*a*, 7*b* can be controlled to lift, so as to be able to lift the agricultural implement relative to the ground.

In this way, each of the arms is attached to the agricultural vehicle using a pivot link L3*a*, L3*b* about the transverse axis (y).

Advantageously, the arms 7*a*, 7*b* can be controlled by lifting means 3*a*, 3*b*.

Advantageously, the arms 7*a*, 7*b* can be retained by lift links 5*a*, 5*b*. The assembly of the lift links allows adjustments to the incline and management of the offset loads, which are more difficult to manage if lifting is associated with the lift links.

However, according to an alternative embodiment, the arms 7*a*, 7*b* can be controlled by lifting means integrated in the lift links 5*a*, 5*b*.

The lift links can be configured according to a fixed length or a floating length mode. When the lift link function is implemented by means of hydraulic cylinders, they can then remotely control the fixed length and floating length modes, the oscillation modes and the modes for increasing the lifting travel of the implement, in addition to or instead of the lifting travel of the device for linking to the chassis of the agricultural vehicle.

Advantageously, and independently of the first and second embodiments, the hitch device can comprise a sensor C for identifying the position of the chassis relative to the agricultural vehicle. In this case, this sensor, called feedback sensor, is positioned on the chassis in order to know the deflections of the chassis relative to the setpoint position, improving the work correction precision and confirming the execution of the recentering for the maneuvers and for transportation.

Thus, the hitch device according to the invention represents a mechanical chain that is naturally stable and easy to control. It allows work to be carried out with strong-pull implements or even implements equipped with disks as work elements.

It also allows the agricultural vehicle to be connected at the three usual hitch points, and therefore without any modification of the components of the agricultural vehicle.

It also allows the hitch device to be lightened and allows the space to be maximized at the transmission line of the agricultural implement.

To summarize, the offset caused by the hitch device is reduced by a third, whilst maintaining the same offset correction functionalities as obtained with the solution described in application WO 2018/172458. It also allows a weight saving of approximately 50%, as well as a significant reduction in the production costs.

Of course, the invention is not limited to the examples described above and numerous developments can be applied to these examples without departing from the scope of the invention. Furthermore, the various features, forms, alternative embodiments and embodiments of the invention can be associated with each other according to various combinations, insofar as they are not incompatible or exclusive of each other.

The invention claimed is:

1. A hitch device for an implement, suitable for being mounted on an agricultural vehicle, wherein said hitch device comprises:

a chassis transverse to the direction of travel of the hitch;

a system for coupling an agricultural implement to said chassis, said coupling system being designed to pivot freely relative to the chassis, about a vertical axis; and an attachment device for attaching the chassis to the agricultural vehicle, the attachment device comprising at least two arms provided with an activation means and intended to link the chassis to the agricultural vehicle, said at least two arms extend in a direction substantially parallel to the direction of travel of the hitch, each of the at least two arms comprising, at a proximal end thereof relative to the chassis, a first pivot link with the chassis, allowing each arm to pivot relative to the chassis about the vertical axis, as well as a second pivot link with the agricultural vehicle, allowing each arm to pivot relative to the agricultural vehicle about the vertical axis, a set of four pivot links when viewed from above thus defining a deformable parallelogram in a horizontal plane perpendicular to the vertical axis that is deformable under the action of the activation means, the second pivot link of the at least two arms is disposed at a distal end thereof relative to the chassis, with said distal end also forming an attachment for attaching said at least two arms to the agricultural vehicle, and said at least two arms each have an elbow, the convexity of said elbow is laterally outward facing, the at least two arms defining a clearance horizontally curved about the vertical axis to avoid interference with elements of the agricultural vehicle comprising tow bars, hitch devices for a towed implement, and a means for controlling powered implements, wherein said at least two arms include a first arm and a second arm, said first arm and said second arm each have said first pivot link connecting to the chassis and said second pivot link connecting to the agricultural vehicle, the second pivot link of each of said first arm and said second arm being laterally displaced from each other, the first pivot link of each of said first arm and said second arm being laterally displaced the same amount as the second pivot link so that the attachment of said first pivot link to the chassis reflects lateral displacement, and said lateral displacement of said first pivot link and said second pivot link form said parallelogram.

2. The hitch device for an implement as claimed in claim 1, wherein a device for coupling the agricultural implement to the chassis comprises a first hook and a second hook disposed on a lower part of the chassis, symmetrically relative to a vertical median plane, with said hooks extending in the opposite direction to the direction of travel of the hitch.

3. The hitch device for an implement as claimed in claim 2, wherein the hooks located on the lower part of the chassis also pivot about the axis extending transvers to the direction of travel of the hitch and are retained by means of a plurality of lift links.

4. The hitch device for an implement as claimed in claim 3, wherein a pivot angle of the two hooks about the vertical axis ranges between 0 and +/−30°.

5. The hitch device for an implement as claimed in claim 3, wherein the pivoting of the hooks about the vertical axis also can be controlled by at least one cylinder, with said at least one cylinder being able to work in a first mode corresponding to the free rotation of the hooks about the vertical axis, and a second mode, in which the rotation of the hooks the vertical axis is locked, with the chassis being transversely extended by a first stabilizer, and even a second stabilizer.

6. The hitch device for an implement as claimed in claim 2, wherein the device for coupling the agricultural implement to the chassis further comprises a third hook located on an upper part of the chassis, with said hook forming an element for retaining the agricultural instrument.

7. The hitch device for an implement as claimed in claim 1, wherein the attachment device for attaching the chassis to the agricultural vehicle comprises, in an upper part, a link element between the upper part of the chassis and the agricultural vehicle, and the at least two arms are advantageously controlled to lift the implement, with an attachment for attaching each arm to the agricultural vehicle then defining said first pivot link and said second pivot link about the axis extending transverse to the direction of travel of the hitch.

8. The hitch device for an implement as claimed in claim 7, wherein the at least two arms are controlled respectively by a first lifting means and a second lifting means and are retained by lifting links.

9. The hitch device for an implement as claimed in claim 8, wherein the at least two arms are controlled respectively by a first lifting means and a second lifting means, both being integrated in the lifting links.

10. The hitch device for an implement as claimed in claim 1, wherein the activation means of the at least two arms are formed by two single-acting cylinders each assigned to one arm, or are even formed by a single double-acting cylinder assigned to one of the at least two arms.

11. The hitch device for an implement as claimed in claim 1, wherein the at least two arms are controlled respectively by a first lifting means and a second lifting means, and the first lifting means and the second lifting means are single-acting or double-acting cylinders.

12. The hitch device for an implement as claimed in claim 1, wherein a pivot angle of the at least two arms about the vertical axis ranges between 0 and +/−45°.

13. The hitch device for an implement as claimed in claim 1, wherein the hitch device comprises a sensor for identifying a position of the chassis relative to the agricultural vehicle.

14. A hitch device for an implement, suitable for being mounted on an agricultural vehicle, wherein said hitch device comprises:

a chassis transverse to the direction of travel of the hitch;

a system for coupling an agricultural implement to said chassis, said coupling system being designed to pivot freely relative to the chassis, about a vertical axis; and an attachment device for attaching the chassis to the agricultural vehicle, the attachment device comprising at least two arms, being provided with an activation means and, being intended to link the chassis to the agricultural vehicle, said at least two arms extend in a direction substantially parallel to the direction of travel of the hitch, each of the at least two arms comprising, at a proximal end thereof relative to the chassis, a first pivot link with the chassis, allowing at least one portion of each arm to pivot relative to the chassis about the vertical axis, as well as a second pivot link with the agricultural vehicle, allowing at least said portion of each arm to pivot relative to the agricultural vehicle about the vertical axis, a set of four pivot links when viewed from above thus defining a deformable parallelogram in a horizontal plane perpendicular to the vertical axis that is deformable under the action of the activation means, wherein said second pivot link is approximately in a middle of each arm so that:

a portion of each arm between said second pivot link and said first pivot link with the chassis is free to rotate about the vertical axis, a portion of each arm between said second pivot link and the attachment for attaching each arm to the agricultural vehicle is not free to rotate about the vertical axis, and lateral movement of the first pivot links avoids interference with elements of the agricultural vehicle comprising tow bars, hitch devices for a towed implement, and a means for controlling powered implements.

15. The hitch device for an implement as claimed in claim 14, wherein the portion of the at least two arms is located between the second pivot link and the point of attachment with the agricultural vehicle is supported by a reinforcement.

* * * * *